Dec. 22, 1931.  W. N. JONES  1,837,970
SAFETY VALVE
Filed Oct. 15, 1930
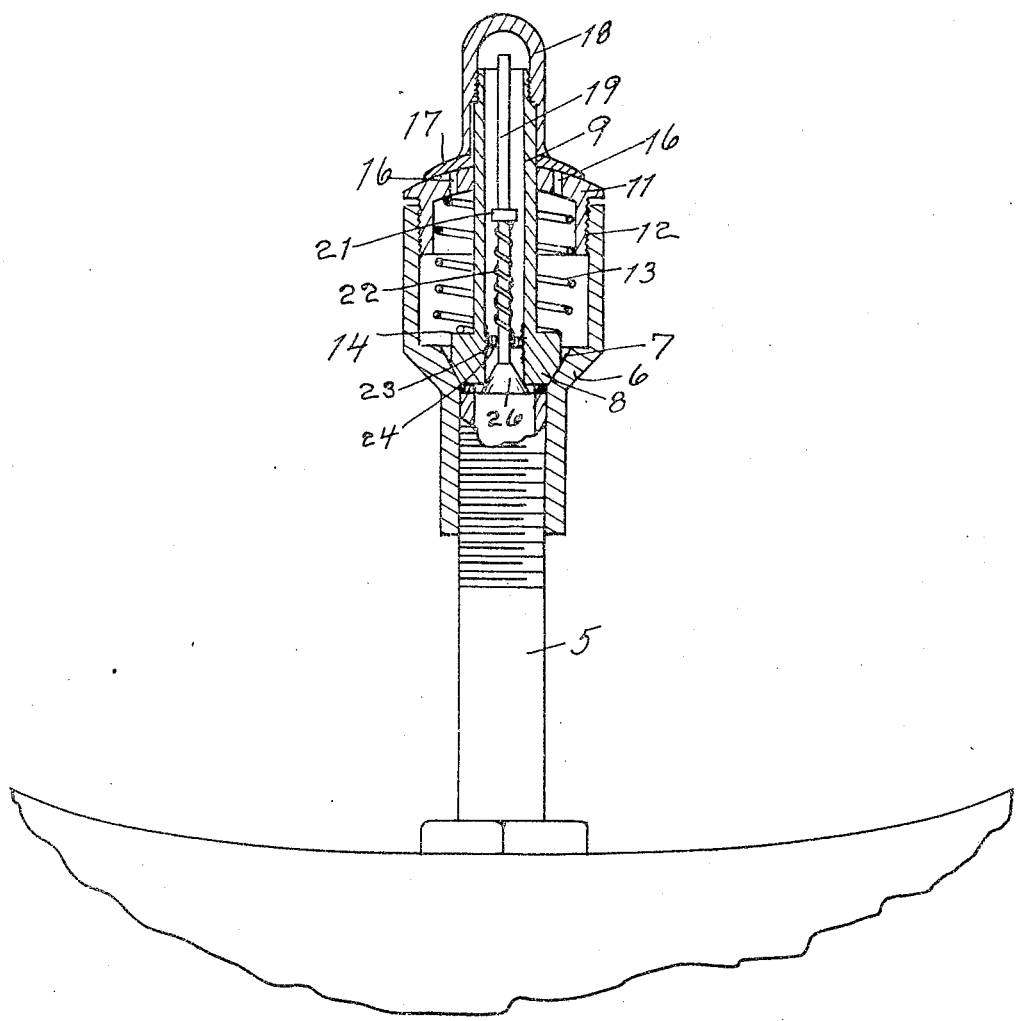
INVENTOR.
WILLIS N. JONES
BY *Victor J. Evans*
ATTORNEY.

Patented Dec. 22, 1931

1,837,970

UNITED STATES PATENT OFFICE

WILLIS N. JONES, OF SALT LAKE CITY, UTAH

SAFETY VALVE

Application filed October 15, 1930. Serial No. 488,968.

This invention relates to improvements in safety valves and has particular reference to a safety valve for use with automobile tires.

The principal object of this invention is to produce a valve arrangement wherein the same may be attached to the ordinary stem of a tire and which will permit air to be injected into the tire until a pre-determined pressure has been reached, and one which will then allow for the escapement of an excess pressure either when inflating the tire or when the tire is under use.

A further object is to produce a device of this character which is simple in construction and therefore economical to manufacture.

A further object is to produce a device which is neat in appearance and one which will not readily detract from the appearance of the vehicle upon which it is placed.

A still further object is to produce a device wherein various pressures may be employed so as to take care of the standard pressures for various sizes of tires.

Other objects and advantages will be apparent during the course of the following description.

The drawing discloses a vertical cross-section of my safety valve as the same would appear when attached to the stem of an automobile tire. In inflating automobile tires it is customary to test the air pressure by employing an air gauge for this purpose. This gauge is intermittently applied to the valve stem until the correct pressure has been placed within the tire. The customary valve in the valve stem prevents the escape of any excess pressure in the tire either while inflated or while running.

It is a well known fact that the pressure within a tire increases, due to the heat of the road and also to sudden blows which are liable to cause the tire to blow-out. Applicant has therefore devised a simple mechanism which may be attached to the stem of the ordinary tire valve which will permit this excess pressure beyond a pre-determined amount, to escape.

In the accompanying drawing wherein for the purpose of illustration is shown a preferred embodiment of my invention, the numeral 5 designates the ordinary valve stem attached to an automobile tire, and the numeral 6 to a casing threaded thereon. The customary end valve within the stem 5 is preferably removed, the purpose of which will be later seen. A valve seat 7 is formed within the casing 6 and is adapted to be connected by a relief valve 8 having a tubular extension 9. This extension 9 is slidable thru a threaded cap 11, threaded as at 12, so as to engage an internal thread formed upon the casing 6. A spring 13 is interposed between the cap 11 and a shoulder 14 formed upon the relief valve 8. The cap 11 is provided with bleeder openings 16 which are covered by a flexible dust guard 17. This dust guard 17 is held against the cap 11 by a threaded covering member 18, threadably engaging the tubular portion 9. Positioned within the tubular portion 9 is a valve stem 19 having a stop 21 against which a spring 22 surrounding the stem 19 abuts. The lower end of this stem abuts a threaded member 23. The valve stem 19 is preferably square in shape so that by rotating the same, the threaded member 23 will be rotated so as to engage the threads formed within the tubular portion. This threaded member is provided with air passages 24 so that air may pass there-thru during inflating the tire. An inlet valve 26 is carried on the lower extremity of the stem 19 and abuts a seat upon the bore of the escape valve. The result of this construction is that when the cover 18 is removed and the ordinary air hose is applied against the upper end of the tubular portion 9, air will pass there-thru, opening the valve 26 and permitting the air to pass into the tire. As soon as a pressure greater than the pre-determined pressure has been reached, the same will exert an upward pressure upon the bottom of the escapement valve and against the tension of the spring 13 with a result that this excess pressure will escape between the escapement valve 8 and its seat 7 and will pass thru the bleeders 16 raising the dust guard 17 and escaping with the atmosphere. This same escapement will take place when the air pressure in the tire is raised thru heat from the road or from any other cause.

It will thus be seen that all the objects above set forth will take place when the same is in use.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

A relief valve comprising a casing having a seat formed therein, an escapement valve adapted to engage said seat, a cap threadedly engaging said casing, a spring interposed between said cap and said escapement valve, said escapement valve having a bore therethru, an inlet valve positioned in said bore and means for holding said valve in engagement with its seat, said cap having a bleeder opening therethru, a flexible dust guard overlying said bleeder opening and a threaded cover member for maintaining said dust guard in engagement with said cap.

In testimony whereof I affix my signature.

WILLIS N. JONES.